United States Patent
Choi et al.

(10) Patent No.: US 8,824,181 B2
(45) Date of Patent: Sep. 2, 2014

(54) APPARATUS AND METHOD FOR A SWITCH MODE POWER SUPPLY CONFIGURED TO REDUCE STANDBY POWER CONSUMPTION

(75) Inventors: Hyo-soon Choi, Suwon-si (KR); Gil-yong Chang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 509 days.

(21) Appl. No.: 13/181,118

(22) Filed: Jul. 12, 2011

(65) Prior Publication Data

US 2012/0120692 A1    May 17, 2012

(30) Foreign Application Priority Data

Nov. 16, 2010   (KR) .................. 10-2010-0114053

(51) Int. Cl.
*H02M 7/217*    (2006.01)
(52) U.S. Cl.
USPC .......................................................... 363/89
(58) Field of Classification Search
USPC .......................................................... 363/89
See application file for complete search history.

(56) References Cited

U.S. PATENT DOCUMENTS

| | | | | |
|---|---|---|---|---|
| 7,123,494 B2* | 10/2006 | Turchi | ............................. | 363/89 |
| 2007/0139984 A1* | 6/2007 | Lo | ................................... | 363/89 |
| 2008/0304195 A1* | 12/2008 | Lin | ................................. | 361/89 |
| 2010/0080026 A1* | 4/2010 | Zhang | ............................ | 363/89 |
| 2012/0120692 A1* | 5/2012 | Choi et al. | ..................... | 363/78 |
| 2012/0161522 A1* | 6/2012 | Nam | ................................ | 307/64 |
| 2013/0308359 A1* | 11/2013 | Chen | ............................... | 363/89 |

* cited by examiner

*Primary Examiner* — Jeffrey Sterrett
(74) *Attorney, Agent, or Firm* — Sughrue Mion, PLLC

(57) ABSTRACT

A switch mode power supply (SMPS) is capable of reducing standby power consumption, and includes a power factor capacitor (PFC) bulk capacitor which supplies power in a standby mode to constant loads by repeatedly charging and discharging a voltage, a PFC controller which controls the voltage to be charged in the PFC bulk capacitor, a first resistor and a second resistor which divide the voltage of the PFC bulk capacitor and output a reference voltage, and a control unit which controls the charging and discharging of the voltage of the PFC bulk capacitor in accordance with the reference voltage.

20 Claims, 8 Drawing Sheets

APPARATUS AND METHOD FOR A SWITCH MODE POWER SUPPLY CONFIGURED TO REDUCE STANDBY POWER CONSUMPTION

CROSS-REFERENCE TO RELATED APPLICATION

This application claims priority from Korean Patent Application No. 10-2010-0114053, filed on Nov. 16, 2010 in the Korean Intellectual Property Office, the disclosure of which is incorporated herein by reference in its entirety.

BACKGROUND

1. Field

Apparatuses and methods consistent with the disclosure provided herein relate to a switch mode power supply, and more particularly, to a switch mode power supply which reduces standby power consumption.

2. Description of the Related Art

As energy regulation on displays increases, methods for reducing standby power consumption by switch mode power supply (SMPS) has gained attention.

As generally known, the SMPS generates good quality electricity free of ripples by switching the switching devices in accordance with a signal of modulated pulse width so that electronic devices operate efficiently. The SMPS can be designed in small sizes and with light weights and high efficiency.

A general SMPS circuit is illustrated in FIG. 1. Particularly in Europe, in order to satisfy harmonic standards, the SMPS generally employs a power factor collection (PFC) circuit 110. Similar to turning on a switch of a display device using a remote controller or the like, a transistor 131 of a power on/off control circuit 130 turns on in normal state to supply power Vcc to a PFC controller 111, thus switching on the secondary output and the screen of the display device.

Referring to FIG. 2, when a user does not watch television (TV), the TV turns to standby mode and when the TV is on standby mode, power supply to the PFC circuit 110 is cut using a standby controller 121 of a standby circuit 120 since the PFC circuit 110 does not need to operate in this state, so the standby circuit 120 alone is driven. That is, the standby power consumption is reduced by reducing the number of the constant power-consuming devices.

However, as illustrated in FIG. 2, there is a limit to the reduction of standby power consumption since some circuit components still consume constant power in standby mode.

SUMMARY

Exemplary embodiments overcome the above disadvantages and/or other disadvantages not described above. Also, exemplary embodiments are not required to overcome the disadvantages described above, and an exemplary embodiment of the present inventive concept may not overcome any of the problems described above.

Exemplary embodiments provide, a switch mode power supply and a method thereof for reducing a constant power consumption in standby mode are provided.

According to an aspect of an exemplary embodiment, there is provided an SMPS including a PFC bulk capacitor which supplies energy to constant loads by repeatedly charging and discharging a voltage in a standby mode, a PFC controller which charges the voltage in the PFC bulk capacitor, a first resistor and a second resistor which divide the voltage of the PFC bulk capacitor and output a reference voltage, and a control unit which controls charging and discharging of the voltage of the PFC bulk capacitor in accordance with the reference voltage.

The control unit may include a zener diode which is short or open in accordance with the reference voltage, and a transistor which is switched on/off to cause the PFC controller to operate in accordance with the operation of the zener diode.

If the zener diode is open, the transistor turns on and the PFC controller operates.

The reference voltage may be set differently depending on the zener diode.

The zener diode may be a 431 zener diode.

The PFC bulk capacitor is charged to a first voltage, discharged to a second voltage and recharged to the first voltage.

The second voltage may be calculated using the reference voltage, the first resistor and the second resistor.

According to an aspect of another exemplary embodiment, there is provided a method for switch mode power supply, which supplies energy to constant loads in a standby mode. The method including outputting a reference voltage, which is obtained by dividing a voltage of a PFC bulk capacitor by first and a second resistors, and which supplies the energy to the constant loads by repeatedly charging and discharging the voltage of the PFC bulk capacitor in accordance with the reference voltage.

The supplying the energy to the constant loads may include causing a zener diode to be short or open in accordance with the reference voltage, and causing a transistor to turn on or off so that the PFC bulk capacitor is charged with the voltage in accordance with the operation of the zener diode.

If the zener diode is open, the transistor turns on.

The reference voltage may be set differently depending on the zener diode.

The zener diode may be a 431 zener diode.

The PFC bulk capacitor is charged to a first voltage, discharged to a second voltage and recharged to the first voltage.

The second voltage may be calculated by using the reference voltage, a resistance of the first resistor and a resistance of the second resistor.

As a result, by supplying energy to constant loads in a manner of repeating instantaneous energy charging and longer period of non-power-consuming section, the standby power consumption is reduced.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
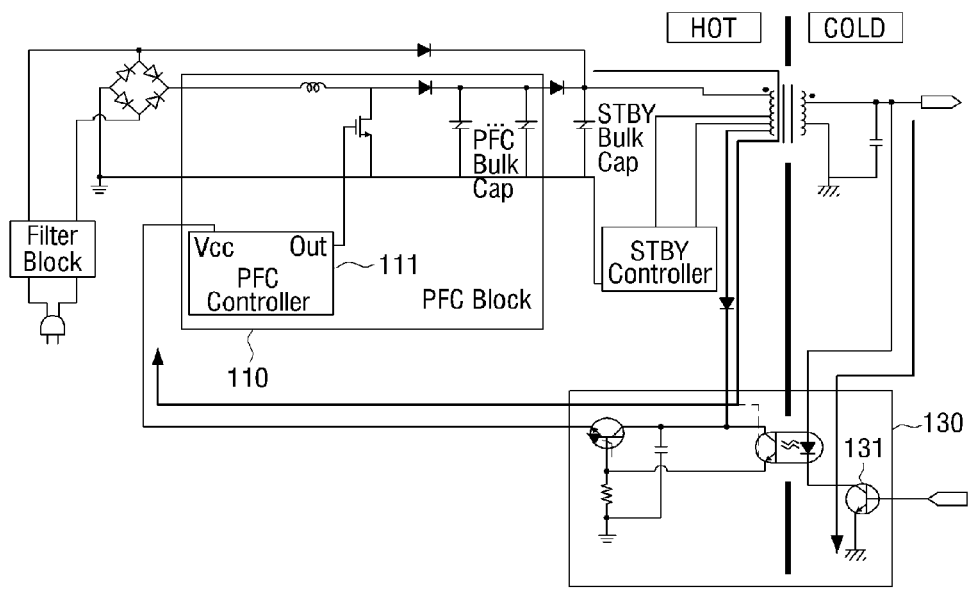
FIG. 1 is a view illustrating a general operation of a switch mode power supply.
Figure 2:
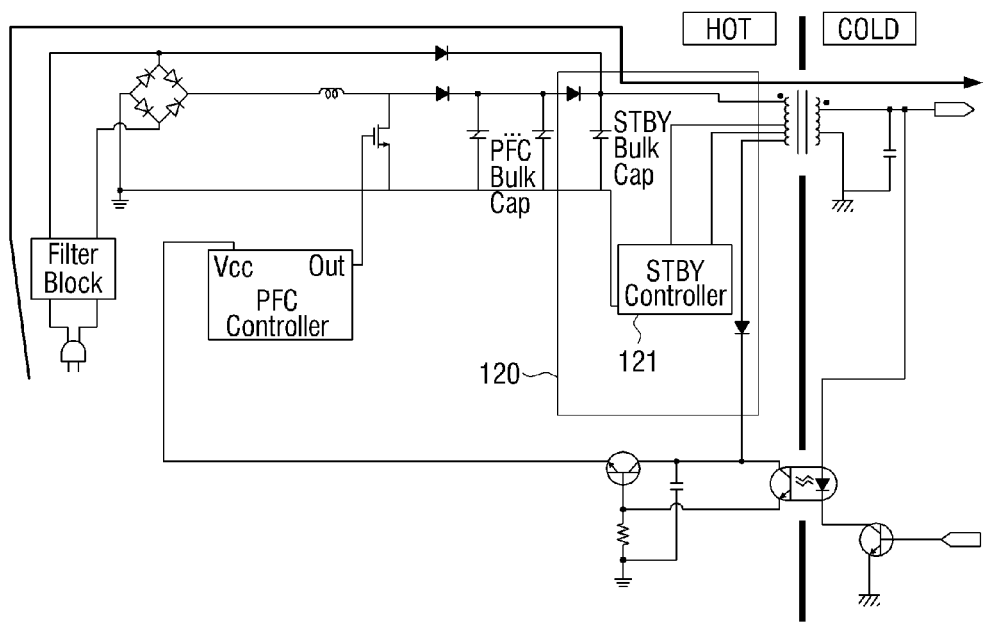
FIG. 2 is a view illustrating an operation of a switch mode power supply in standby mode.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the inventive concept with unnecessary detail.

Figure 3:
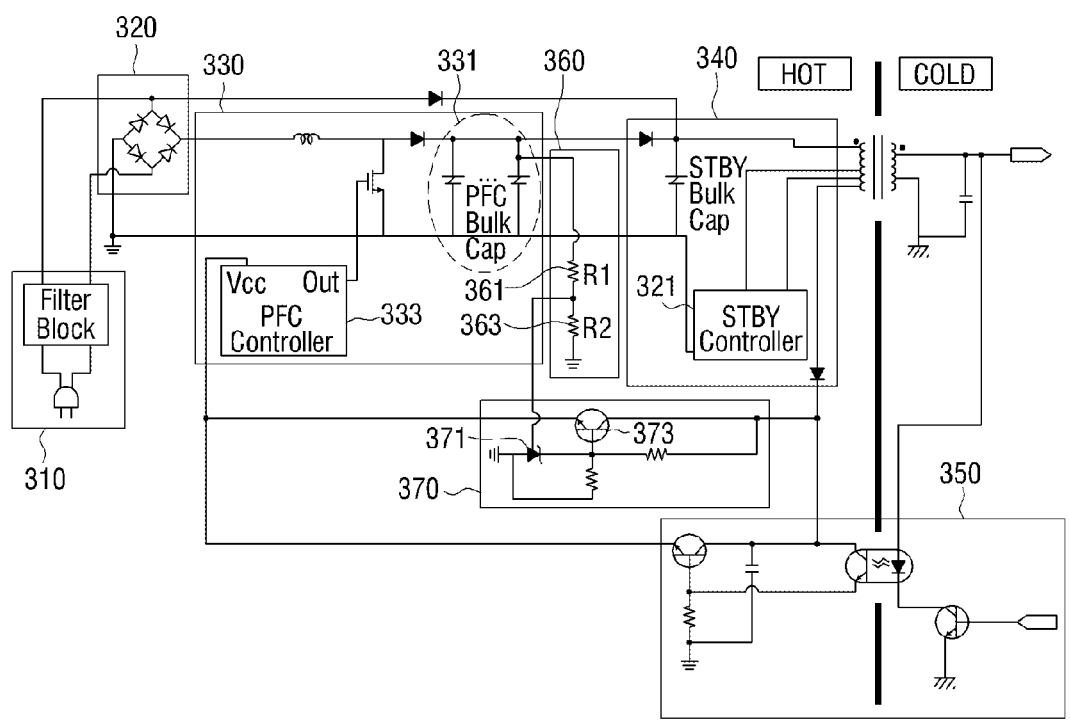
FIG. 3 is a circuit diagram provided to explain a switch mode power supply according to an exemplary embodiment.

FIG. 3 is a circuit diagram provided to explain an SMPS according to an exemplary embodiment.

Referring to FIG. 3, the SMPS according to an exemplary embodiment may include an alternating current (AC) power input 310, a rectifier circuit 320, a PFC circuit 330, a standby (STBY) circuit 340, a power on/off control circuit 350, a PFC bulk capacitor voltage measuring unit 360, and a control unit 370.

The AC power input 310 receives, for example, 110V or 220V of AC power.

The rectifier circuit 320 full-wave rectifies and smoothes the inputted AC voltage.

The PFC circuit 330 outputs DC voltage to comply with the harmonic regulations and may include a PFC bulk capacitor 331 and a PFC controller 333.

The PFC bulk capacitor 331 herein may supply power to the constant loads while repeatedly charging and discharging the voltage in standby mode.

In other words, in standby mode, power may be supplied to the constant loads while the instantaneous charging and the longer-period of non-power-consuming section that uses power stored at the PFC bulk capacitor repeat.

The PFC controller 333 controls the PFC bulk capacitor 331 so that the PFC bulk capacitor 331 is charged with the voltage.

The STBY circuit 340 cuts off power supply to the PFC circuit 330 using the standby controller 321 of the STBY circuit 340 in a conventional standby mode, when the PFC circuit 330 does not need to operate.

For example, when a user of a display device switches on the display device with a remote controller, the power on/off control circuit 350 switches on the secondary side output by supplying power to the Vcc of the PFC controller of the PFC circuit 330 so that the display can turn on. If the user switches off the display device using the remote controller, the power on/off control circuit 350 switches off the secondary side output by not allowing power supply to the Vcc of the PFC controller of the PFC circuit 330.

In standby mode, the PFC bulk capacitor voltage measuring unit 360 measures voltage of the PFC bulk capacitor 331, and as illustrated in FIG. 3, the PFC bulk capacitor voltage measuring unit 360 may include a first resistor 361 and a second resistor 363.

The first and second resistors 361, 363 divide the voltage of the PFC bulk capacitor 331 to output a reference voltage.

Further, the PFC bulk capacitor 331 may repeat the process of charging to the first voltage (e.g., approximately 400V), discharging to the second voltage, and recharging to the first voltage.

In other words, the voltage of the PFC bulk capacitor may be the second voltage, and the power is discharged to the first voltage and recharged to the second voltage so that the above-mentioned non-power-consuming section repeats.

The second voltage herein may be computed by using the reference voltage, the first resistor R1 and the second resistor R2, and computed differently depending on the AC input voltage.

The second voltage may be computed by "reference voltage*(R1+R2)/R2".

By way of example, if the AC input voltage is 110 Vac, the power can be discharged to 115 Vrms. If the AC input voltage is 220 Vac, power can be discharged to 311 Vrms.

The control unit 370 controls charging and discharging of the voltage with respect to the PFC bulk capacitor 331 according to the reference voltage, and as illustrated in FIG. 3, may include a zener diode 371 and a transistor 373.

The zener diode 371 is shorted or open in accordance with the reference voltage, and the transistor 373 switches on/off so that the PFC controller operates in accordance with the operation of the zener diode 371.

If the zener diode 371 is open, the transistor 373 turns on so that power is supplied to the Vcc of the PFC controller to drive the PFC controller.

On the other hand, if the zener diode 371 is shorted, the transistor 373 turns off so that the PFC controller does not operate.

In other words, the PFC bulk capacitor repeatedly charges and discharges in accordance with the reference voltage which is obtained by dividing the voltage of the PFC bulk capacitor, and as a result, energy is supplied to the constant loads during the non-power-consuming section in which voltage charged in the PFC bulk capacitor is discharged. Accordingly, by repeatedly charging and discharging the PFC bulk capacitor and thus repeating the non-power-consuming section, the SMPS according to an exemplary embodiment supplies energy to the existing constant loads in a manner of reducing standby power consumption.

The reference voltage may be set differently depending on the types of the zener diode 371. For example, 2.5V reference voltage may be set for a 431 zener diode.

Figure 4:
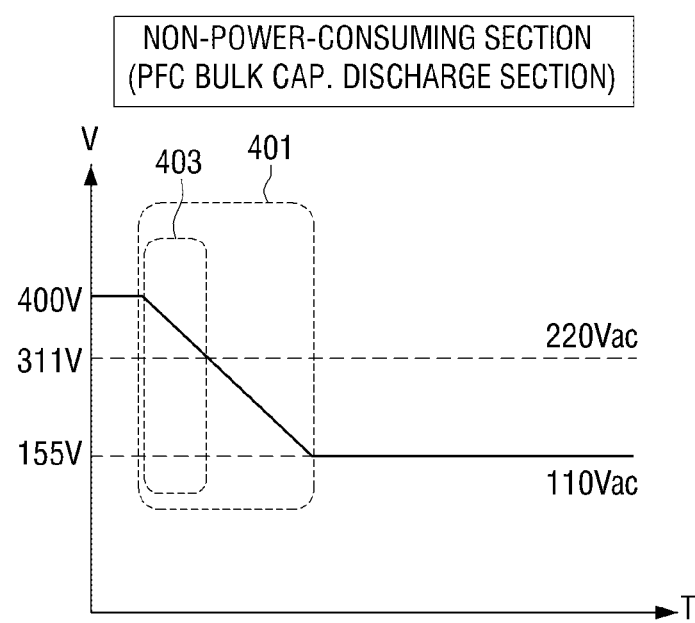
FIG. 4 is a view provided to explain a discharge waveform of a PFC bulk capacitor in accordance with an input voltage in non-power-consuming section of a switch mode power supply according to an exemplary embodiment.

FIG. 4 is a view provided to explain discharge waveforms of the PFC bulk capacitor in accordance with the input voltage in the non-power-consuming section of a SMPS according to an exemplary embodiment.

Referring to FIG. 4, if the PFC bulk capacitor is charged approximately up to 400V, the input voltage 220 Vac (or 110 Vac) is discharged up to 311 Vrms (or 155 Vrms), and the time duration of the non-power-consuming section may vary depending on the input voltage.

Accordingly, if the input voltage is 110 Vac, the non-power-consuming section 401 may last for about 75 seconds, and if the input voltage is 220 Vac, the non-power-consuming section 403 may last for about 21 seconds. Therefore, for higher energy efficiency, the SMPS in one exemplary embodiment may desirably have lower input voltage to thus have longer discharge section. For example, in the U.S. where 110V are used, may have higher standby power reduction efficiency than in other parts of the world such as Europe or South Korea where 220V are used.

Figure 5:
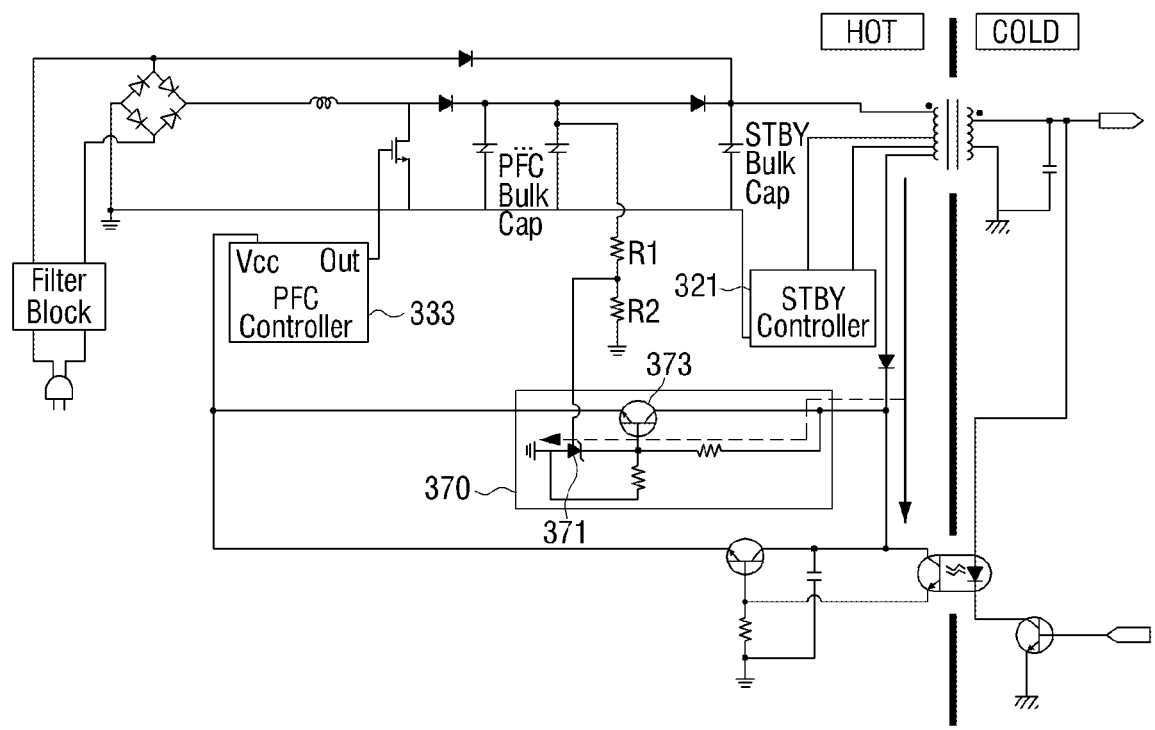
FIGS. 5 and 6 are views provided to explain an operation of a switch mode power supply in accordance with a reference voltage according to an exemplary embodiment.
Figure 6:
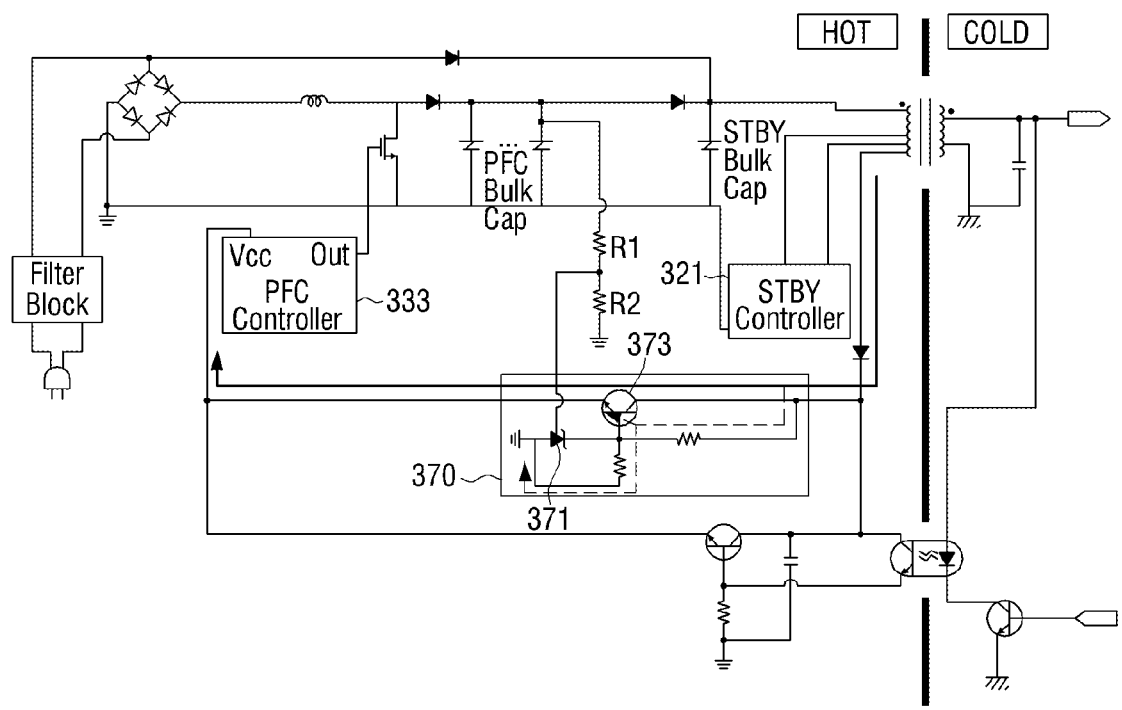

FIGS. 5 and 6 are views provided to explain the operation of the SMPS in accordance with the reference voltage according to an exemplary embodiment.

Referring to FIGS. 5 and 6, if the zener diode 371 is implemented to be a 431 zener diode, the reference voltage (Vref) is set to 2.5V so that when the reference voltage is below 2.5V, the zener diode 371 is open and the transistor 373 turns on to thereby supply power to the Vcc of the PFC controller and charge the power to the PFC bulk capacitor. When the reference voltage is above 2.5V, the zener diode 371 is short and the transistor 373 turns off so that the PFC circuit does not operate and the charging of the PFC bulk capacitor extends to the discharging of the power up to the second voltage (i.e., non-power-consuming section) according to the input voltage. In this state, energy stored at the PFC bulk capacitor is supplied to the constant loads to thereby reduce power consumption in the standby mode.

Figure 7:
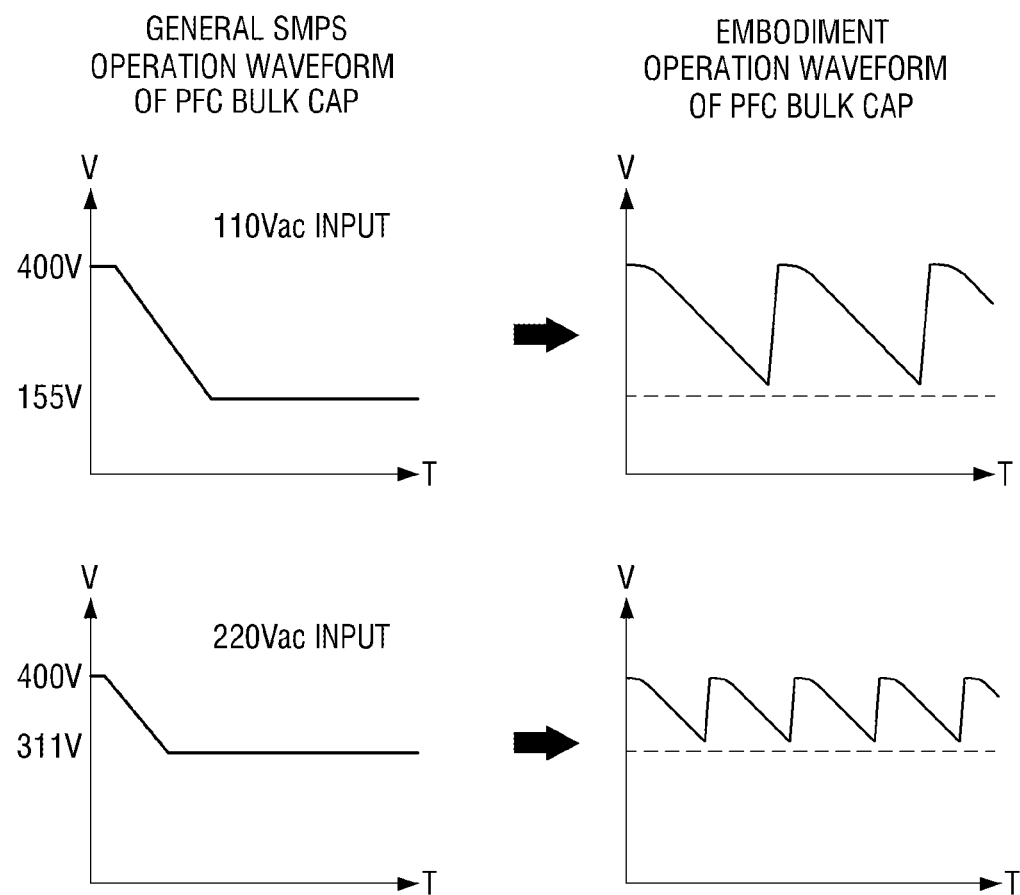
FIG. 7 is a view provided to explain comparison of the operation waveforms between a PFC bulk capacitor of a general conventional switch mode power supply and a PFC bulk capacitor of a switch mode power supply according to an exemplary embodiment.

FIG. 7 is a view provided to explain comparison of the operation waveforms between a PFC bulk capacitor of a general conventional switch mode power supply and a PFC bulk capacitor of a switch mode power supply according to an exemplary embodiment.

Referring to FIG. 7, the operation waveform of the PFC bulk capacitor of a general conventional SMPS shows that the input voltage of 110 Vac is discharged to 155V and maintained. In one exemplary embodiment, the operation waveform of the PFC bulk capacitor of a SMPS shows that the charging and discharging repeat between 400V and 155V.

Further, the operation waveform of the PFC bulk capacitor of a general conventional SMPS shows that the input voltage of 220 Vac is discharged to 311V and maintained. However, in one exemplary embodiment, the operation waveform of the PFC bulk capacitor of the SMPS shows that the charging and discharging repeat between 400V and 311V.

By repeating the charging and discharging of the PFC bulk capacitor, i.e., by repeating the non-power-consuming section, in the standby mode, the energy of the PFC bulk capacitor is supplied to the constant loads without having power energy consumption at the standby circuit devices. As a result, standby power consumption is reduced.

Figure 8:
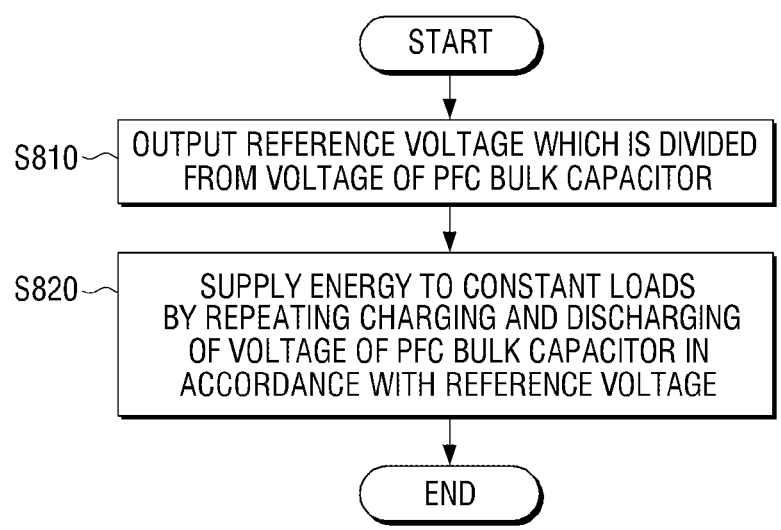
FIG. 8 is a flowchart provided to explain a method for supplying switch mode power according to an exemplary embodiment.

FIG. 8 is a flowchart provided to explain a method for supplying switch mode power according to an exemplary embodiment.

The method for supplying switch mode power according to an exemplary embodiment will be explained herein below, while the overlapping explanation will be omitted as much as possible for the sake of brevity.

First, at operation S810, according to a method for switch mode power supply which supplies energy to constant loads in standby mode, a reference voltage, which is divided from the PFC bulk capacitor voltage by the first and second resistors, is output.

At operation S820, the energy is supplied to the constant loads as the charging and discharging of voltage of the PFC bulk capacitor 331 repeat according to the reference voltage.

The supplying S820 of the energy to the constant load may include causing the zener diode 371 to be short or open in accordance with the reference voltage; and switching on or off the transistor 373 to charge the PFC bulk capacitor 331 with the voltage according to the operation of the zener diode 371.

By way of example, if the zener diode 371 is open, the transistor 373 turns on so that power is supplied to the Vcc of the PFC controller 333 to operate the PFC controller 333. If the zener diode 371 is short, the transistor 373 turns off so that the PFC controller 333 does not operate.

That is, according to the reference voltage, which is divided from the voltage of the PFC bulk capacitor 331, charging and discharging of the PFC bulk capacitor 331 repeat, and as a result, energy is supplied to the constant loads in the non-power-consuming section in which the charged voltage of the PFC bulk capacitor 331 is discharged. Accordingly, by repeating charging and discharging of the PFC bulk capacitor 331, the method for supplying switch mode power according to an exemplary embodiment supplies energy to the existing constant loads through repeating non-power-consuming section and reduces standby power consumption.

The reference voltage may be set differently depending on the types of the zener diode. For example, 2.5V of reference voltage may be set for a 431 zener diode.

Further, the PFC bulk capacitor 331 may repeat the process of charging to the first voltage (e.g., about 400V), discharging to the second voltage and recharging to the first voltage.

In other words, the voltage of the PFC bulk capacitor 331 may be the second voltage, and the power is discharged at the first voltage and recharged before the second voltage so that the above-mentioned non-power-consuming section repeats.

The second voltage herein may be computed by using the reference voltage, the first resistor R1 and the second resistor R2, and computed differently depending on the AC input voltage.

The second voltage may be computed by "reference voltage*(R1+R2)/R2".

The foregoing exemplary embodiments and advantages are merely exemplary and are not to be construed as limiting the present inventive concept. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A switch mode power supply (SMPS) comprising:
a standby controller configured to trigger the switch mode power supply in and out of a standby mode;
a power factor capacitor (PFC) bulk capacitor that is configured to supply power in the standby mode to constant loads by repeatedly charging and discharging a voltage;
a PFC controller that is configured to control charging of the voltage in the PFC bulk capacitor;
a power on/off control circuit configured to supply the voltage used by the PFC controller, and withhold the voltage when in the standby mode;
a first resistor and a second resistor that are configured to divide the voltage of the PFC bulk capacitor and output a reference voltage; and
a control unit that is configured to detect the reference voltage, control the charging of the PFC bulk capacitor by the PFC controller in response to determining that the reference voltage is less than a threshold, and disable the PFC controller to discharge the voltage of the PFC bulk capacitor in response to determining that the reference voltage is greater than the threshold.

2. The SMPS of claim 1, wherein the control unit comprises:
a zener diode which is shorted or opened in accordance with the reference voltage; and
a transistor which is switched on/off to operate the PFC controller in accordance with the shorting or opening of the zener diode.

3. The SMPS of claim 2, wherein, when the zener diode is open, the transistor turns on and the PFC controller operates.

4. The SMPS of claim 2, wherein the reference voltage is set according to a type of the zener diode.

5. The SMPS of claim 2, wherein the zener diode is a 431 zener diode.

6. The SMPS of claim 1, wherein the PFC bulk capacitor is charged to a first voltage, discharged to a second voltage and recharged to the first voltage.

7. The SMPS of claim 6, wherein the second voltage is determined using the reference voltage, the first resistor and the second resistor.

8. The SMPS of claim 6, wherein the second voltage is calculated by the following equation: Vref * (R1+R2)/R2, where R1 is resistance of the first resistor, R2 is a resistance of the second resistor, and Vref is the reference voltage.

9. The SMPS of claim 1, further comprising a standby circuit which cuts off the power to the PFC circuit using a standby controller, when the PFC circuit does not operate.

10. The SMPS of claim 9, further comprising a power on/off control circuit which supplies the power to the PFC controller.

11. A method for switch mode power supply (SMPS) which supplies power to a load in a standby mode, the method comprising:
   outputting a reference voltage, which is obtained by dividing a voltage output of a power factor capacitor (PFC) bulk capacitor by first and second resistors;
   detect, at a control circuit, the voltage output to the load in a standby mode based on the reference voltage;
   determine, at the control circuit, whether the voltage output to the load is less than a threshold voltage in the standby mode;
   enable, at the control circuit, voltage transmission from a power circuit through the control circuit to a PFC controller to charge the PFC bulk capacitor in the standby mode in response to determining that the voltage output to the load is less than the threshold voltage; and
   disable the control unit in the standby mode in response to determining that the voltage output to the load is greater than the threshold voltage.

12. The method of claim 11, wherein the supplying the power to the constant loads comprises:
   shorting or opening a zener diode in accordance with the reference voltage; and
   turning on or off a transistor so that the PFC bulk capacitor is charged with the voltage in accordance with the shortening or opening of the zener diode.

13. The method of claim 12, wherein, when the zener diode is open, the transistor turns on.

14. The method of claim 12, wherein the reference voltage is set according to a type of the zener diode.

15. The method of claim 12, wherein the zener diode is a 431 zener diode.

16. The method of claim 11, wherein the PFC bulk capacitor is charged to a first voltage, discharged to a second voltage and recharged to the first voltage.

17. The method of claim 16, wherein the second voltage is calculated by using the reference voltage, a resistance of the first resistor and a resistance of the second resistor.

18. A switch mode power supply (SMPS) comprising:
   a power factor capacitor (PFC) circuit that is configured to supply power to a load by repeatedly charging and discharging a voltage in a standby mode;
   a PFC bulk capacitor voltage measuring unit that is configured to generate a reference voltage by dividing the voltage of the PFC circuit and output the reference voltage; and
   a control unit that is configured to detect the reference voltage, control the charging of the PFC circuit in response to determining that the reference voltage is less than a threshold, and disable the PFC circuit to discharge the voltage of the PFC circuit in response to determining that the reference voltage is greater than the threshold.

19. The SPMS of claim 18, wherein the PFC circuit comprises:
   a power factor capacitor (PFC) bulk capacitor which supplies the power to constant loads by repeatedly charging and discharging the voltage in the standby mode; and
   a PFC controller which controls the charging of the voltage in the PFC bulk capacitor.

20. The SPMS of claim 19, wherein the PFC bulk capacitor voltage measuring unit comprises a first resistor and a second resistor which divide the voltage of the PFC bulk capacitor and output the reference voltage.

* * * * *